Dec. 26, 1961         K. O. HEINTZ         3,015,086
CONTINUOUS-WAVE SEISMIC PROSPECTING
Filed Oct. 22, 1959
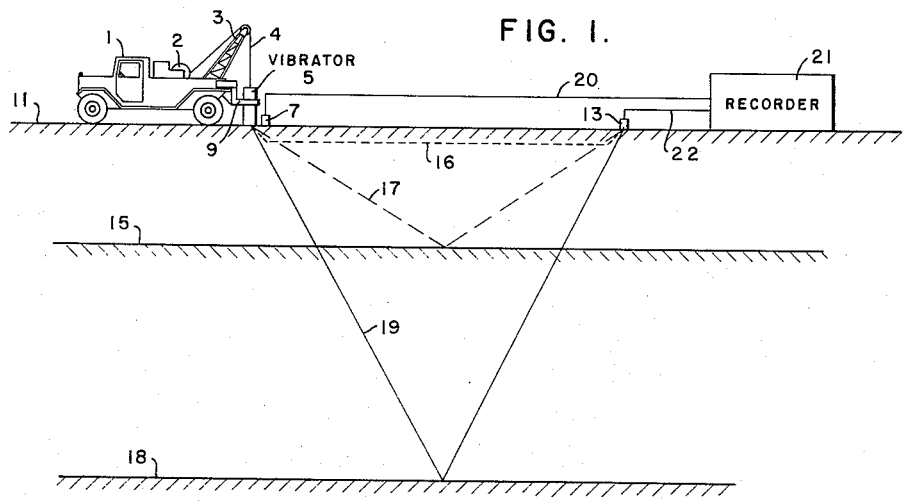
FIG. 1.
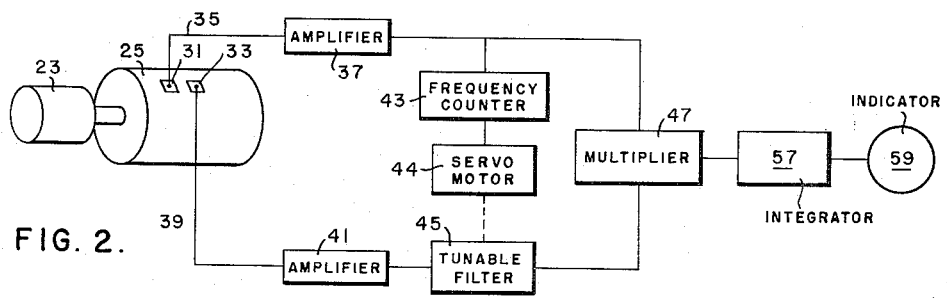
FIG. 2.
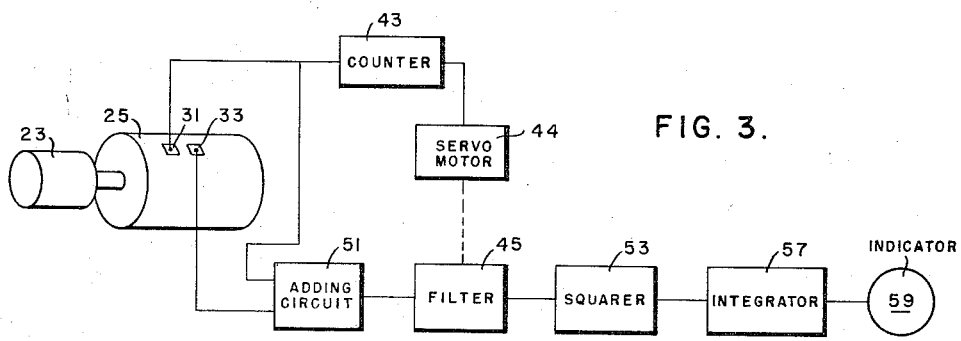
FIG. 3.
FIG. 4.
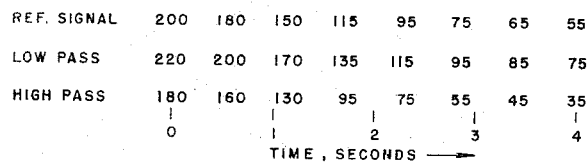
*INVENTOR.*
KARL O. HEINTZ,
BY *John B. Davidson*
                  ATTORNEY.

United States Patent Office 3,015,086
Patented Dec. 26, 1961

3,015,086
CONTINUOUS-WAVE SEISMIC PROSPECTING
Karl O. Heintz, Houston, Tex., assignor, by mesne assignments, to Jersey Production Research Company, Tulsa, Okla., a corporation of Delaware
Filed Oct. 22, 1959, Ser. No. 848,072
5 Claims. (Cl. 340—15)

This invention relates generally to continuous-wave seismic prospecting, and more particularly to the improvement in signal-to-noise ratio in connection with the analysis of records obtained by continuous-wave seismic prospecting.

In the more usual method of seismic exploration, a dynamite charge is exploded at a first point located on the surface of the earth, and the resulting vibrations are recorded at one or more additional points spaced from the first point. When this method is used, all of the energy of the signal is transmitted at substantially the same time as a compressional wave pulse. Elimination of undesired components of the composite received signal is by means of frequency discrimination.

A somewhat different approach to seismic exploration utilizes the so-called "continuous-wave seismic method," such as is described in U.S. Patent No. 2,521,130, Sherbatskoy. In a refinement of this method described in U.S. Patent No. 2,688,124, Doty, energy is generated sequentially at different frequencies over a more or less extended period of time. The overall transmitted signal is nonrepetitive during a time interval which is at least as long as the longest travel time to be determined. The energy is transmitted for a period of several seconds and the discrimination between components of the composite received signal is obtained by correlation of time series respectively representative of the transmitted and received signal.

Considerable difficulty has been encountered in correlating the time series representative of the transmitted and received signal as a result of the rather low ratio of the amplitude of the desired components of the received signal to the amplitude of the undesired components of the signal.

In accordance with one aspect of the present invention, the time series representative of the received signal is filtered so as to remove frequency components of the received signal that are more than a given number of cycles above and more than a given number of cycles below a given frequency. The given frequency is varied so as to substantially coincide with the frequency of the time series representative of the transmitted signal as the time series representative of the transmitted signal and of the received signal are cross-correlated. The time series are repetitively, electrically cross-correlated for each of a plurality of time shifts of the time series representative of the composite signal relative to the time series representative of the transmitted signal until extreme values of the electrical output signal are obtained which are indicative of optimum cross-correlation. The values of the time shifts are indicative of the travel times to reflecting earth strata. In this manner, received signals that may be of large amplitude and which will tend to impede the cross-correlation of the transmitted signal with the received signal are very effectively eliminated so that the signal-to-noise ratio during cross-correlation is substantially improved.

In accordance with another aspect of the invention, electrical signals representative of the transmitted signal and the received signal are adjustably shifted in time relationship and are added together before being filtered as described above. The sum signal is then filtered while the reference frequency of the filter is varied to substantially coincide with the electrical signal representative of the transmitted signal. Amplitude variations in the output signal of the filter are thereupon emphasized, preferably by squaring the amplitude of the filtered signal. The amplitude-emphasized signal is then integrated. The output signal of the integrator is indicative of the correlation between the electrical signals representative of the transmitted signal and the received signal for the particular predetermined time relationship therebetween. The predetermined time relationship is varied until an extreme signal is obtained from the integrator, which signal will be indicative of the optimum relationship for cross-correlation between the signals applied to the adding circuit.

A more complete understanding of the invention may be had from a consideration of the following detailed description thereof when taken in connection with the accompanying drawings, wherein:

FIG. 1 is a schematic representation of a continuous-wave seismic exploration apparatus carrying out a seismic observation on a cross-section of the earth. The figure indicates different paths along which seismic energy may be propagated in carrying out the observation;

FIG. 2 is a schematic diagram of apparatus that may be utilized in one embodiment of the invention;

FIG. 3 is a schematic diagram of apparatus that may be utilized in another embodiment of the invention; and FIG. 4 is a time diagram indicating relative simultaneous values which may be assigned to the reference signal and the high and low cut-off frequencies of the band-pass filters illustrated in FIGS. 2 and 3, which diagram is useful in understanding the present invention.

Following the teachings of the prior art with regard to continuous-wave seismic prospecting, a vibrator 5, which may be an unbalanced flywheel, is used to generate elastic vibration energy. The unbalanced flywheel may be driven by a hydraulic motor (not shown) and is adapted to generate an elastic or seismic signal which is generally sinusoidal in wave shape and which continuously varies in frequency. The frequency range over which the vibrator varies may be between 40 cycles and 200 cycles. This variation in frequency may take place over an interval of between 2 to 6 seconds, depending upon the depth of the deepest reflecting horizon of interest. During this interval the transmitted signal is nonrepetitive in that each impulse transmitted to the ground has a slightly different period than the immediately preceding impulse and the immediately following impulse, and in that each of the time series of impulses has a different period. The nonrepetitive elastic signal transmitted into the earth by the vibrator 5 may be of relatively low amplitude. It is preferable, however, that the amplitude be as large as possible.

The vibrator 5 may be physically moved on a truck 1 and may be lifted from the earth by a crane or boom 3 in association with a winch 2 and a line 4. A guide member 9 may be provided for the purpose of holding the vibrator 5 against lateral movement so that the housing and the component parts of the vibrator will not be damaged while the apparatus is being moved. Rigidly coupled to the vibrator is an elastic wave detector 7 which may be a geophone. The function of geophone 7 is to produce an electrical signal indicative of the elastic wave transmitted into the earth by the vibrator 5.

Positioned at a distance from vibrator 5 and detector 7 is another detector 13. While detector 13 is here shown as a single geophone, the detecting means may be a plurality of geophones stationed either in line or in an array in manners well known to the prior art. If an array of geophones is used, the output circuits thereof may be connected together to produce a single sum signal as described in U.S. Patent No. 2,759,551, Carlisle, or the output signals may be recorded individually.

The output signals of geophone 7 and geophone means 13 are coupled to a recorder 21 by electrical leads 20 and 22, respectively. Recorder 21 is of the type that records electrical signals in reproducible form. A preferable embodiment for recorder 21 is the magnetic recorder that has found wide acceptance in the seismic art. Recorder 21 should record the electrical signals produced by geophones 7 and 13 as traces in side-by-side relationship in the same time scale. Recorder 21 may be interconnected with vibrator 5 in the usual manner so that recordation of the output signals of geophone 7 extends over a predeterminable time during which the vibrator 5 is producing signals between given frequency limits.

The record made by recorder 21 must be capable of being reproduced so as to produce representative signals which are each respectively indicative of the frequency, amplitude, and phase relation of the signals recorded thereon.

Seismic signals transmitted into the earth by vibrator 5 may follow a plurality of paths while traveling from vibrator 5 to geophone 13. Three such paths are designated by the reference numerals 16, 17, and 19. The signals traveling along paths 17 and 19 are respectively reflected by reflecting beds or horizons 15 and 18. A portion of the energy may be transmitted from vibrator 5 to geophone 13 through the weathered layer immediately underlying the surface 11 of the earth. The signals produced by seismic waves traveling along ray path 17 probably will be much stronger than the signals produced by waves traveling along ray path 19, and probably also it will be found that high frequency components are somewhat attenuated as a result of the natural filtering action of the earth. If recorder 21 is of the magnetic type, the records may be either on a magnetic drum or on magnetic tape. Manifestly, magnetic tape is preferable inasmuch as the tape records may be transported easily to a remote play-back location. In the ensuing description it will be assumed that the records are such that they can be played back at locations other than the location at which the records are made.

In FIG. 2 there is shown a magnetic play-back apparatus comprising a tape transport drum 25 driven by a constant speed electric motor 23. The speed of rotation of the play-back drum may be greater or less than the speed of the drum on which the magnetic records were recorded. Associated with play-back drum 25 are at least two playback heads 31 and 33 which are circumferentially movable about the periphery of the drum. Play-back heads 31 and 33 will be assumed to be positioned so as to reproduce the electrical output signals of geophones 7 and 13, respectively.

Magnetic play-back heads 31 and 33 are respectively coupled to alternating current amplifiers 37 and 41 by electrical leads 35 and 39, respectively. The output of amplifier 41 is coupled to a multiplying circuit 47 by means of a variable band-pass electrical filter network 45. Filter network 45 is adapted to attenuate signals less than a given number of cycles below a variable reference frequency and more than a given number of cycles above the reference frequency. The filter network is tunable in that the reference frequency may be varied over a predetermined range of frequencies. Filter 45 may be a variable electronic filter such as the type manufactured by Spencer Kennedy Laboratories, Inc. of Boston, Massachusetts, described in Spencer Kennedy Laboratories' Instruction Book IB 302-1 12-56 at Section 3.33, page 18. The upper and lower cutoff frequencies of this band-pass filter are controlled by variable resistors in the filter network.

The output signal of amplifier 37 is coupled directly to multiplying circuit 47. Multiplying circuit 47 may be any of a number of well known circuits wherein an output signal is derived that is indicative of the product of two electrical signals connected to input circuits thereof. The output signal of amplifier 37 also is applied to a frequency counting device 43 adapted to produce an output voltage having an amplitude indicative of the frequency of an alternating current coupled thereto. Devices of this nature are well known to the art; a particularly suitable device has been used in the AN/ARN-1 radio altimeter. The output voltage of the frequency counter is used to control a servo motor 44 which, in turn, is mechanically connected to the frequency controlling elements of the tunable filter so that the cutoff frequencies of the tunable filter are controlled in accordance with the frequency of the output signal of amplifier 37. The frequency counter 43, servo motor 44, and frequency controlling elements of tunable filter 45 are adjusted so that the upper and lower cutoff frequencies of filter 45 are substantially a given number of cycles above and a given number of cycles below the frequency of the output signal of amplifier 37. Thus, the signal supplied to multiplier 47 from amplifier 41 has only frequency components falling within the pass-band of the tunable filter 45 as determined by the adjustments of frequency counter 43, servo motor 44, and tunable filter 45.

The pass-band of the tunable filter 45 may be between 10 and 50 cycles. It is preferable that the upper and lower cutoff frequencies of the filter be an equal number of cycles above and below the frequency of the output signal of amplifier 37, but this is not critical and deviations therefrom may be made in accordance with the desires of the operator. The number of cycles in the pass-band may be variable. For example, the upper and lower frequencies of the pass-band may be maintained approximately one-half octave above and approximately one-half octave below the frequency of the output signal of amplifier 37.

The output signal of multiplier 47 is integrated by means of integrating circuit 57. The function of multiplier 47 and integrator 57 is to cross-correlate the output signals of the amplifier coupled thereto and to derive an output signal having a magnitude which is indicative of the correlation between the signals. A device of this type is described in U.S. Patent No. 2,688,124, Doty, and will not be further described herein. The indicator 59 may be an ammeter, a recording oscillograph, or other device adapted to indicate the magnitude of the output signal with integrator 57.

The operation of the tunable filter 45 may be best understood by reference to FIG. 4. In FIG. 4 are shown the frequencies of a reference signal at various times from a given time arbitrarily designated as at zero seconds on the scale. Assume that the output of the reference signal from amplifier 37, which corresponds to the signal produced by geophone 7, is 200 cycles at zero time, and assume that the filter is adapted to pass a band of frequencies 20 cycles above the frequency of the reference signal and 20 cycles below the frequency of the reference signal. FIG. 4 shows that the frequency of the signal decreases gradually for a period of 4 seconds to a frequency of 55 cycles. The upper cutoff frequency and the lower cutoff frequency of the band-pass filter are respectively 220 cycles and 180 cycles at zero time. The upper cutoff frequency gradually diminishes to 75 cycles at 4 seconds while the lower cutoff frequency is gradually diminishing to 35 cycles. At all times during the 4-second interval, the low pass and high pass frequencies are maintained the same number of cycles above and the same number of cycles below the frequency of the reference signal.

The embodiment of the invention shown in FIG. 3 differs from that shown in FIG. 2 in that the output signal of the reproducing heads 31 and 33 are coupled to the input circuit of an adding circuit 51 to derive a single signal indicative of the sum of the signals reproduced by the recording heads. The sum signal is applied through filter 45 to a squaring circuit 53. The function of the squaring circuit 53 is to emphasize amplitude variations in the output signal of filter 45. The output signal of the squaring circuit 53 is applied to an integrating circuit 57. The function of the adding circuit 51, squaring circuit 53, and the integrating circuit 57 is to cross-correlate the output signals of reproducing heads 31 and 33. Counter 43 and servo motor 44 are coupled to filter 45 in the same manner as described above and perform the same functions.

The steps of adding, squaring, and integrating a plurality of electrical signals for the purpose of cross-correlating the signals is described in U.S. application Serial No. 382,588 of F. J. Feagin et al. for "Method and Apparatus for Interpreting Geophysical Data," filed September 28, 1953, now U.S. Patent No. 2,927,656. The advantage of the circuit of FIG. 3 is that any phase shift produced by filter 45 is suffered equally by both signals and does not appreciably affect the operation of the circuit. Unless the tunable filter 45 of the circuit of FIG. 2 is a very carefully designed, phase shift may be introduced that could adversely affect the circuit. If the filter does introduce substantial phase shift, a compensating circuit would have to be introduced into the circuit between amplifier 37 and multiplier 47 so that the output signal of amplifier 37 would be shifted in phase by an equal amount.

The embodiments of FIGS. 2 and 3 function in substantially the same manner. The magnetic heads 31 and 33 are circumferentially adjusted relative to each other around the periphery of the tape transport drum to introduce a given time shift between the signals reproduced thereby. The reproduced signals are cross-correlated either by the multiplier 47 and integrator 57 or by the adding circuit 51, the squaring circuit 53, and the integrator 57. The relative positions of the heads 31 and 33 are varied until extremes of the integrator output signals indicate optimum cross-correlation. The filter network 45 eliminates all frequencies either from the output of amplifier 41 (FIG. 2) or the output of adding circuit 51 (FIG. 3) that are outside of the band-pass of the filter. Inasmuch as the desired cross-correlation is between the time series indicative of the output signals of geophone 7 and corresponding portions of the composite signal from geophone 13 which are indicative of reflections from subsurface reflecting horizons and which correspond to the output signals of geophone 7, and also since signals outside of the band-pass attributable to "noise" cannot be cross-correlated with the output signal from reproducing head 31, the signal-to-noise ratio of the system is substantially improved. The possibility of obtaining spurious indications of cross-correlation is considerably diminished and the significance of the output signal of the integrator as an indicia of cross-correlation is enhanced.

The invention is not necessarily to be restricted to the specific structural details, arrangement of parts, or circuit connections herein set forth, as various modifications thereof may be effected without departing from the spirit and scope of the invention.

What is claimed is:

1. In the process of determining the travel time of a signal between spaced points wherein there is transmitted from a local area a vibratory signal made up of a succession of energy pulses which, after propagation over a plurality of paths, is then detected as a composite signal in a remote local area, which transmitted signal is at least two seconds in duration and is nonrepetitive for a period a least as long as the travel time of said vibratory signal along any of said paths by which it reaches the detection area at usable signal levels, and wherein there are simultaneously and individually recorded time series respectively representative of said transmitted signal and said composite signal, and such time series are reproduced and correlated over a predetermined period while shifting the time relation thereof with respect to their time-phase relationship as originally recorded and in which the amount of shift of said time relation which yields an extreme value of the correlation value is a parameter of said travel time, the improvement which comprises: before each correlation of the composite signal and the transmitted signal, filtering said reproduced composite signal to eliminate frequencies thereof a given number of cycles above and a given number of cycles below a variable reference frequency; and varying the reference frequency so that the reference frequency is substantially the same as the frequency of the reproduced time series representative of the transmitted signal.

2. A method according to claim 1 wherein the passband of frequencies above and below the reference frequency is between 10 and 50 cycles.

3. A method according to claim 1 wherein the composite signal and the transmitted signal are simultaneously filtered to equalize phase shift that may be introduced therein by the step of filtering.

4. In the method of determining the travel time of a signal between spaced points wherein there is transmitted from a local area a vibratory signal made up of a succession of energy pulses which, after propagation over a plurality of paths, is then detected as a composite signal in a remote local area, which transmitted signal is at least two seconds in duration and is non-repetitive for a period at least as long as the travel time of said vibratory signal along any of said paths by which it reaches the detection area at usable signal levels, and wherein there are simultaneously and individually recorded time series respectively representative of said transmitted signal and said composite signal, and such time series are reproduced with a predetermined time relationship therebetween, the improvement comprising: adding together the reproduced time series indicative of said transmitted signal and the reproduced time series indicative of said composite signal to obtain a sum signal; filtering the sum signal to eliminate all frequencies thereof a given number of cycles above and a given number of cycles below a variable reference frequency; varying the reference frequency so that the reference frequency is substantially the same as the frequency of the reproduced time series representative of the transmitted signal; emphasizing the amplitude of the filtered signal; integrating the amplitude emphasized signal to obtain an output signal which is indicative of the correlation between the added signals; and repetitively reproducing the time series indicative of said transmitted signal and the time series indicative of said composite signal with a different predetermined time relationship therebetween with each reproduction thereof.

5. In a system for cross-correlating a nonrepetitive reference signal of substantial duration appearing at a first input terminal and a composite signal appearing at a second input terminal and containing one or more wave trains each corresponding to at least a portion of said reference signal, the improvement comprising: adding circuit means connected to said first and second input terminals adapted to sum the signals appearing at said first and second input terminals; variable frequency filter means coupled to said adding circuit means adapted to eliminate all components of the adding circuit output signal less than a given number of cycles below a variable reference frequency of said filter and more than a given number of cycles above the reference frequency; means connected to said first input terminal and to said variable frequency filter means adapted to vary the filter reference frequency to coincide with the frequency of the reference signal; amplitude emphasizing circuit means coupled to said filter means adapted to emphasize amplitude variations in the filter output signal; and integrating means connected to the output of said amplitude emphasizing circuit means adapted to integrate the output signal of said amplitude emphasizing circuit means to produce an output signal the amplitude of which is indicative of the cross-correlation between signals appearing at said first and second input terminals.

References Cited in the file of this patent

UNITED STATES PATENTS

| | | |
|---|---|---|
| 2,235,089 | Sparks | Mar. 18, 1941 |
| 2,521,130 | Scherbatskoy | Sept. 5, 1950 |
| 2,688,124 | Doty | Aug. 31, 1954 |
| 2,836,359 | Mazzagatti | May 27, 1958 |